Figure 1:
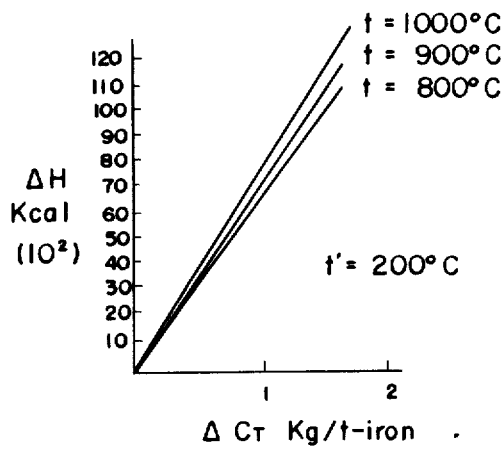

United States Patent

[11] 3,581,070

[72] Inventors Keiji Tsujihata;
 Masatoshi Shimada; Hiromi Asai; Yasuhiro Sawada; Zensaku Ayuha, all of, Japan
[21] Appl. No. 774,581
[22] Filed Nov. 1, 1968
[45] Patented May 25, 1971
[73] Assignee Nippon Steel Corporation
[32] Priority Mar. 4, 1963
[33] Japan
[31] 38/11311
 Continuation of application Ser. No. 348,631, Mar. 2, 1964, now abandoned.

[54] APPARATUS FOR OPERATING A SHAFT FURNACE BY DETECTING THE FALLING SPEED OF THE CHARGE
2 Claims, 14 Drawing Figs.

[52] U.S. Cl. .................................................. 235/151.1, 266/27, 75/41
[51] Int. Cl. ....................................................... G06f 15/46
[50] Field of Search .......................................... 235/151.1, 151; 75/41, 42; 266/27

Primary Examiner—Malcolm A. Morrison
Assistant Examiner—Joseph F. Ruggiero
Attorney—Wenderoth, Lind and Ponack ABSTRACT: This invention relates to a method and apparatus for always maintaining optimum operating conditions of a blast furnace by measuring the sinking speed of the charge and detecting deviations thereof from a predetermined sinking speed obtained statistically, superposing signals of logical operation obtained by the analysis of various factors representing operating conditions of the furnace on the signal representing the said deviation, and subjecting the blast conditions such as temperature and humidity of blast, amount of fuel and amount of blast to a pulse control and or stepped control according to the result of the superposition.

INVENTORS
Keiji Tsujihata
Masatoshi Shimada
BY, Hiromi Asai
Yasuhiro Sawada
Zensaku Ayuha INVENTORS
Keiji Tsujihata
Masatoshi Shimada
BY Hiromi Asai
Yasuhiro Sawada
Zensaku Ayuha

| ELEMENT | SYMBOL | EXPLANATION |
|---|---|---|
| 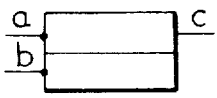 | M | a memory element which memorizes an input (a) and gives an output (c). But, the output (c) is eliminated by an input (b). |
| 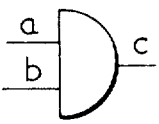 | A | an element which indicates "and - relation", that is, gives an output by all inputs. An output (c) is given by both an input (a) and an input (b). |
| 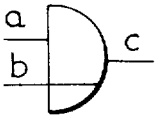 | O | an element which indicates "or - relation", that is, gives an output by one of inputs. An output (c) is given by either an input (a) or an input (b). |
| 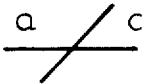 | N | an element which indicates the negation. That is, if there is an input (a) the output (c) is eliminated, and if there is no input 6 (a), the output (c) is given. |
| 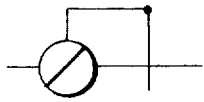 | IT | an element which indicates a transformer |
|  | AP | an element which indicates an amplifier |
| 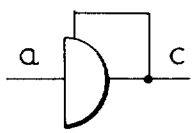 | TD | an element which indicates a delay element. An output is given a certain time after an input is given. |

FIG.4A

INVENTORS
Keiji Tsujihata
Masatoshi Shimada
BY Hiromi Asai
Yasuhiro Sawada
Zensaku Ayuha Wenderoth, Lind & Ponack, attys INVENTORS
Keiji Tsujihata
Masatoshi Shimada
BY Hiromi Asai
Yasuhiro Sawada
Zensaku Ayuha

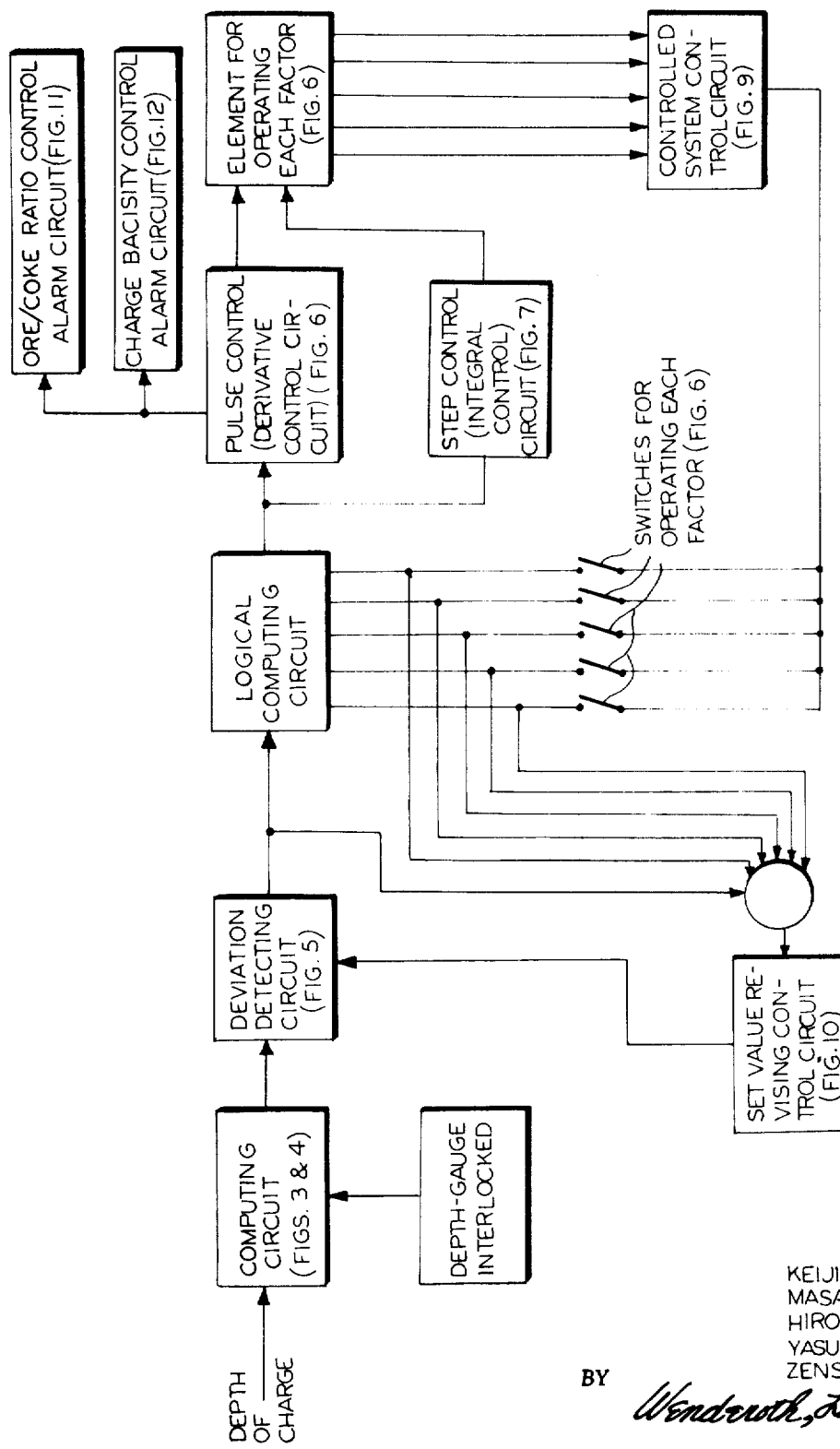

APPARATUS FOR OPERATING A SHAFT FURNACE BY DETECTING THE FALLING SPEED OF THE CHARGE

This application is a continuation of application Ser. No. 348,631 filed Mar. 2, 1964 and now abandoned.

This invention relates to an operating method of a shaft furnace, more particularly, to a method of operating a shaft furnace in always maintaining the optimum operating conditions of the furnace by detecting the falling speed of the charge.

Heretofore, in general the operation of a blast furnace has been carried out in the following manner that the operators regulate the temperature and humidity of the blast and the amount of the charge (mainly iron ore in this case) so that the composition of the molten iron may attain the predetermined values, on the ground of their synthetic estimation of the changes in the reaction conditions within the furnace obtained by putting all observed changes in available variables together, such as changes in composition, temperature and pressure of a top gas and in addition thereto changes in compositions in molten iron and molten slag, which would occur, however, with a great time lag. However, in the above conventional regulating method carried out by the operators, the regulation which is quantified according to a certain norm is almost infeasible, because such a manual regulation contains many elements, the regular features of which are not yet sufficiently clarified, and moreover the blast furnace itself is a controlled system which has a great time lag. In many cases, such a regulation is carried out only relying on the skill and intuition of the operators. Consequently, it happens often that the abnormal conditions within the furnace are discovered too late, thereby too much time is elapsed in taking the necessary actions therefor. Moreover, the incorrect and erroneous decisions are also possible. Thus, there occurred in practice many cases, in which the unsteadiness in the furnace conditions and fluctuation in the composition of pig iron have been caused by these factors.

There exist two categories of factors which cause the fluctuations in the furnace operating conditions, that is, external and internal factors.

The following may be enumerated as the external factors:
1. changes in the physical conditions of the charge (water content, granularity, porosity, antipressure, strength etc.)
2. fluctuations in the chemical compositions of the charge (composition of components, reducibility etc.)
3. fluctuations in the amount of the charge (error in weighing, error in the actual weight according to the attached water content etc.)

The following belong to the internal factors:
1. unequal distribution of gas within the furnace
2. unequal distribution of temperature within the furnace
3. segregation due to granularity or specific weight of the charge
4. unequal oxygen equivalent blown in from the tuyeres above-mentioned It is well known that the conditions within the furnace vary from hour to hour due to the above-mentioned1 mentioned various factors. Therefore, it is self-explanatory that the belated discovery of the abnormal conditions within the furnace, belated regulation thereof and incorrect or erroneous decision of the regulation measures are absolutely not permitted in order to secure the steady furnace conditions and to maintain or elevate the productivity of the furnace.

The present invention relates to a method and apparatus for operating the blast furnace, in which the above defects may be eliminated.

The present invention is to provide a method of automatizing the operation of a shaft furnace, for particularly a blast furnace.

Another object of the present invention is to provide a method of controlling the operation of the furnace to keep the optimum operating conditions.

The other object of the present invention is to provide a method of remarkably stabilizing the operation of the furnace conditions and of obtaining the desired composition of the product of the furnace, pig iron.

The other object of the present invention is to provide a method of maintaining the blast conditions and charge conditions to the optimum state by quickly detecting the changes in the operating conditions in the shaft furnace.

The other object of the present invention is to provide an apparatus for practicing the above method.

The fundamental idea of the present invention will be explained in the following: the basic step of the automatic controlling method according to the present invention resides in adjusting the blast conditions, for instance, temperature and humidity of the blast, amount of the blast, amount of fuel to be blown in and the like by detecting the falling speed of the charge to obtain the optimum operating conditions of the furnace. More precisely, the falling speed of the charge is detected and compared with the optimum falling speed of the charge which has been tentatively preset according to the statistically obtained data or the results of the previous control. According to the direction of the deviation of the actual falling speed from the reference speed obtained from the above comparison the blast conditions are adjusted so as to reduce the said deviation to zero. However, besides the above blast conditions there are other conditions to be taken into consideration in controlling the operating conditions of the furnace, that is, the furnace conditions. As the important factors which represent the furnace conditions there may be enumerated Si and S contents of the pig iron produced, basicity of the slag, temperature and composition of the top gas. These factors have also their own preset values to be aimed respectively and the falling speed of charge is to be also controlled according to the direction of the deviations of the actual values of these factors obtained from the analyses from the preset values thereof. If the control signal according to the direction of the deviation of the falling speed is in contradiction to the control signal according to the deviation of the factors representing the furnace conditions the control of the basic step, that is, the control of the blast conditions by the control signal according to the direction of deviation of the falling speed of the charge is not carried out. In this case, the preset value of the falling speed of the charge as the reference value itself is to be revised after the observation of the results of continuing operations under the existing conditions for some time. If both directions will coincide with each other, the control of the blast conditions according to the direction of deviation of the actual falling speed of the charge from its preset value is carried out. In this case, the pulse-control (proportional derivative action) is carried out on trial. If the deviation of the falling speed of the charge still remains in the same direction as that before the pulse-control of the blast conditions, even after the pulse-control has been carried out, this means that the basic values of the blast conditions, on the ground of which the pulse-control has been carried out, would be inadequate. Therefore, the basic values of the blast conditions are to be revised. In this case, the adjustment is carried out in step-control (integral action). Thus, according to the control method of the present invention the blast conditions are adjusted by detecting the falling speed of the charge, simultaneously taking the furnace conditions into consideration, in a pulse-control and further, if necessary, in a step-control to obtain the optimum operating conditions of the furnace and regulate the temperature and composition of the product, pig iron. However, as the blast furnace itself is a controlled system, which is very difficult to be controlled, it occurs sometimes such a case that after having performed the above-mentioned pulse-control and further a step-control there remains still an offset to be eliminated. In this case, in addition to the above controls the charge conditions, for instance, amount, composition and physical conditions of the charge, are subjected to a step-control to eliminate the offset.

As regards the control signals according to the deviations of the actual values of the factors representing the furnace conditions, which are obtained from the analyses, from their preset values as above mentioned, the following explanations are added here.

1. Si content of the pig iron is mainly influenced by the temperature of the hearth of the furnace and it decreases in general when the falling speed of the charge increases. Therefore, in the case of the detecting falling speed of the charge being over the preset value, Si content should be within the range of its desired value of below the same, and vice versa. If Si content shows, nevertheless, the value exceeding said range of the desired value in this case, it will contradict to the control signal of the deviation of the falling speed of the charge. In such a case, the control action on the basis of the said control signal is not carried out, because such a control signal as of decreasing the falling speed will effect in the direction of more and more increasing Si content.

2. S content of the pig iron is closely connected with Si content and increases in contrary to Si content when the falling speed of the charge increases and the temperature of the hearth of the furnace is lowered. Therefore, S content should be within the range of its desired values or over the same, when the detecting falling speed of the charge is over the preset value. If not so, it contradicts to the control signal of the falling speed.

3. The basicity of the slag, that is, the ratio of CaO to $SiO_2$, decreases mostly when the falling speed of the charge increases, because in such a case the hearth of the furnace will be short of the heat value and Si content will be reduced. Strictly speaking, besides the change in $CaO/SiO_2$ of the slag corresponding to the change in Si content as above mentioned, there is another change in $CaO/SiO_2$ which is determined by the composition of the charge. Anyhow, $CaO/SiO_2$ of the slag should be within the range of its desired values of below the same, when the detected falling speed of the charge is over its preset value. Therefore, when performing the control action of the blast conditions according to the deviation of the falling speed, the ratio of CaO to $SiO_2$ contained in the charge is also to be checked at the same time.

4. The change in the ratio of CO to $CO_2$ of the top gas indicates the change in the indirect reduction ratio, so far the charge undergoes substantially no change in composition of its components and the decrease of $CO_2$ means the decrease of the indirect reduction ratio. $CO_2$ begins to decrease while CO begins to increase several hours before the falling speed of the charge increases.

5. The temperature of the top gas has a tendency to rise in general when $CO_2$ decreases or CO increases.

6. The ratio of ore to coke is mostly large when the actual falling speed of the charge is over its preset value.

7. The composition of the charge in granularity is a factor which is indefinite and difficult to treat. Generally it is recognized that if the charge is of small granularity, the reductability of the charge is good but the permeability is not sufficient. The distribution of the granularity of 10 to 30 mm. is usually preferable, though it will vary somewhat according to the capacity of the furnace.

When carrying out the control action of the blast conditions, $CO/CO_2$ and temperature of the top gas, the ratio of ore to coke and the composition of the charge in granularity should be checked, whether they are usual or not. All of the above-mentioned factors, which represent the furnace conditions, are closely connected with each other, and even if one of them shows the deviation contradictory to the control signal of the falling speed of the charge the control action of the blast conditions according to said control signal should not be performed. It is performed first when the conditions of all above factors coincide with the signal of controlling the blast conditions according to the deviation of the falling speed of the charge.

The control of the blast conditions, that is, temperature of the blast, humidity thereof and amount of fuel to be blown in, according to the control signal of the falling speed will bring the thermal effects on the heat value of the hearth of the furnace and combustion temperature, thereby the furnace conditions are influenced. For instance, by elevating the temperature of the blast according to the control signal when the actual falling speed is below the preset value, the heat value of the hearth is elevated, resulting in an increase in Si content and a decrease in S content and further the combustion temperature is also elevated, thereby the melting zone is elevated and consequently the draught resistance of the bosh of the furnace is increased. The thermal effect and its sequent influences on the furnace conditions of reducing the humidity of the blast are almost the same as those of elevating the temperature of the blast. But, the effect of reducing the humidity of the blast on an increase in the heat value of the hearth is not so notable as that of elevating the temperature of the blast. When increasing the amount of the fuel (for instance, heavy oil), the heat value of the hearth will be increased, but the combustion temperature will be lowered. Further, the conductivity of heat of flame will be improved, though only in case of heavy oil.

The present invention will be explained more in detail in reference with the attached drawings.

Figure 2:
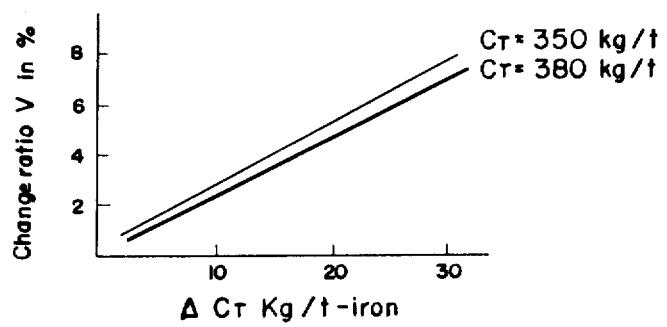
Figure 3:
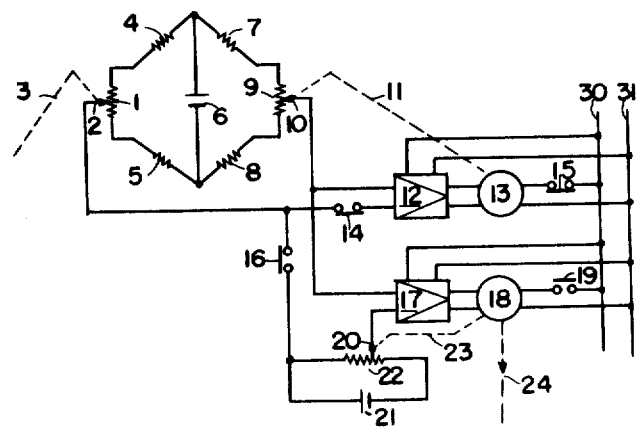
Figure 5:
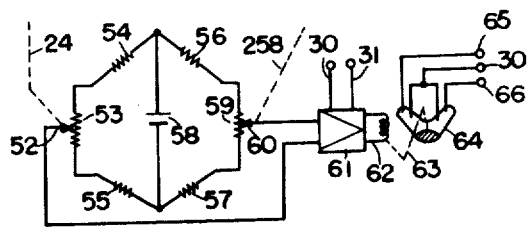
Figure 4B:
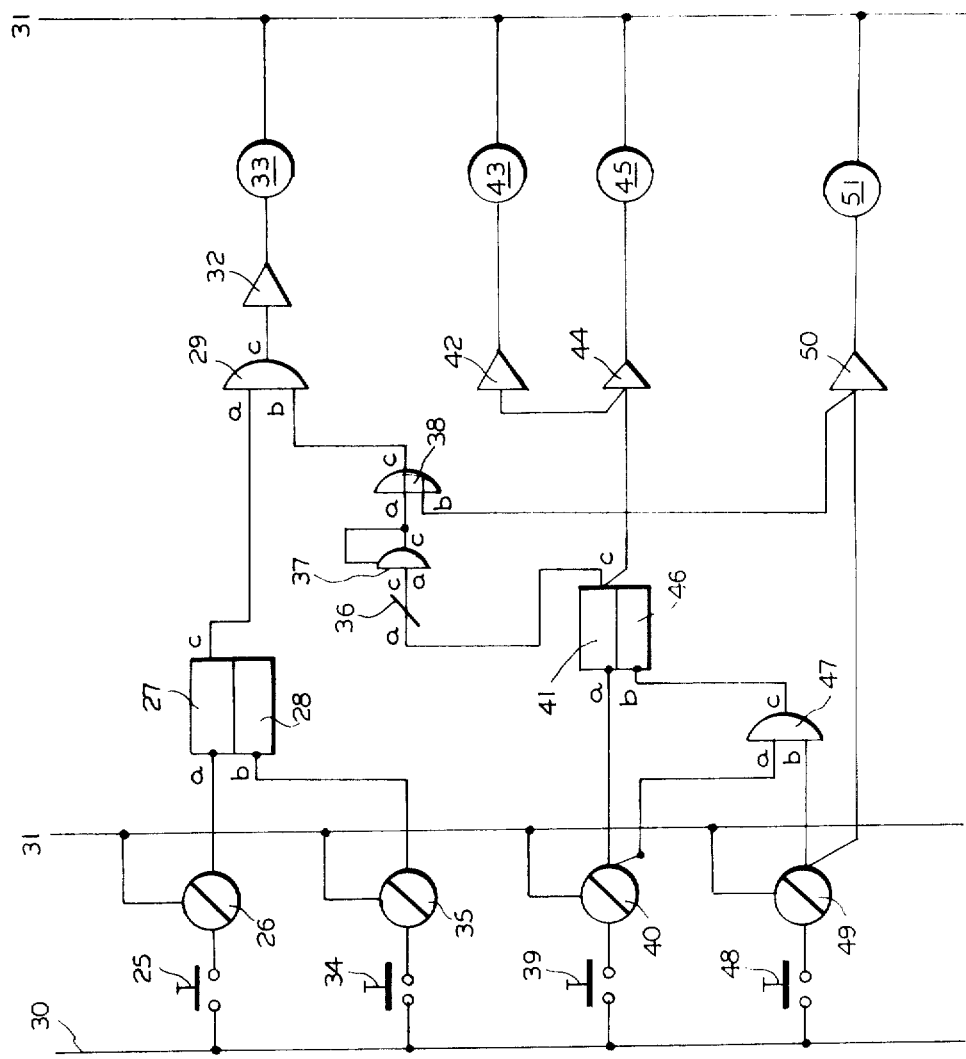
Figure 6:
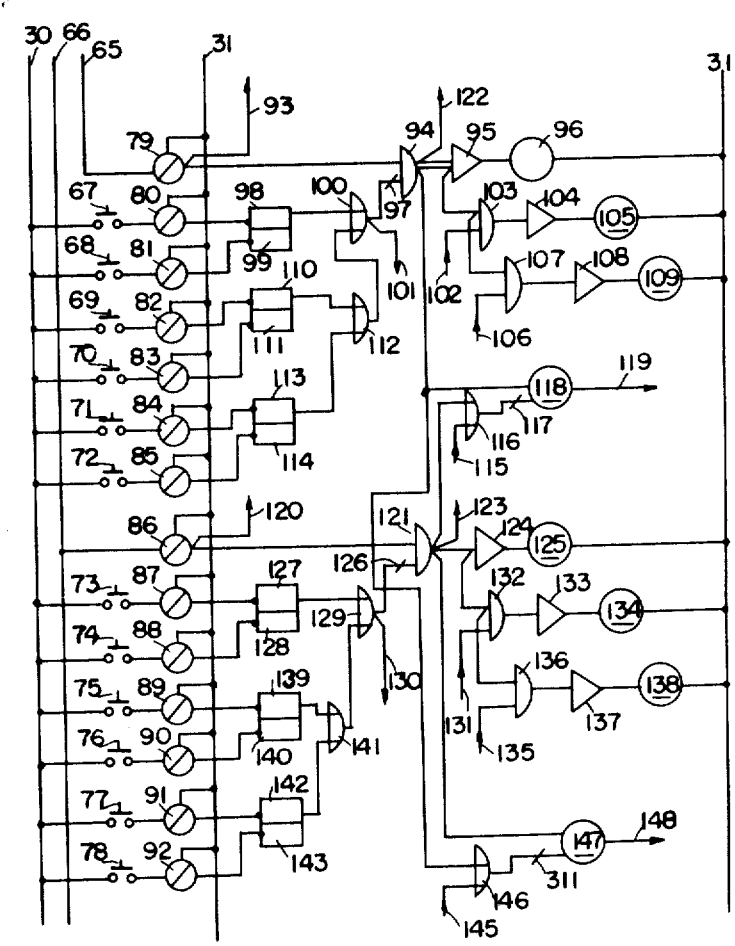
Figure 7:
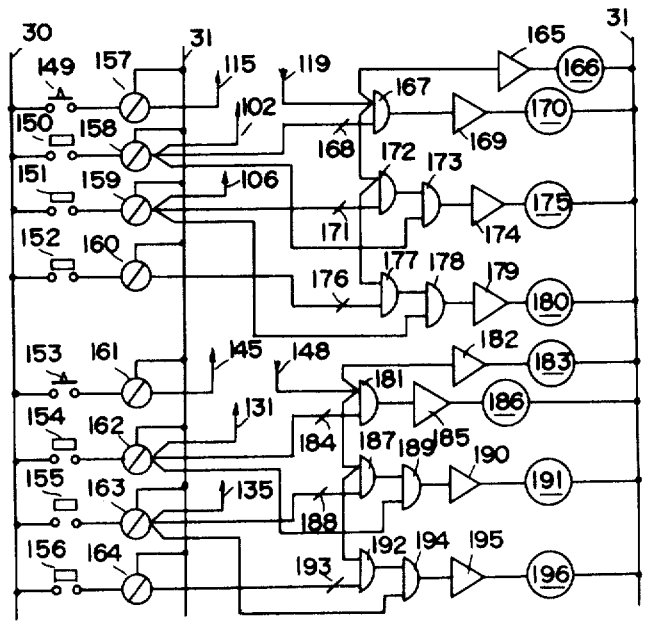
Figure 8:
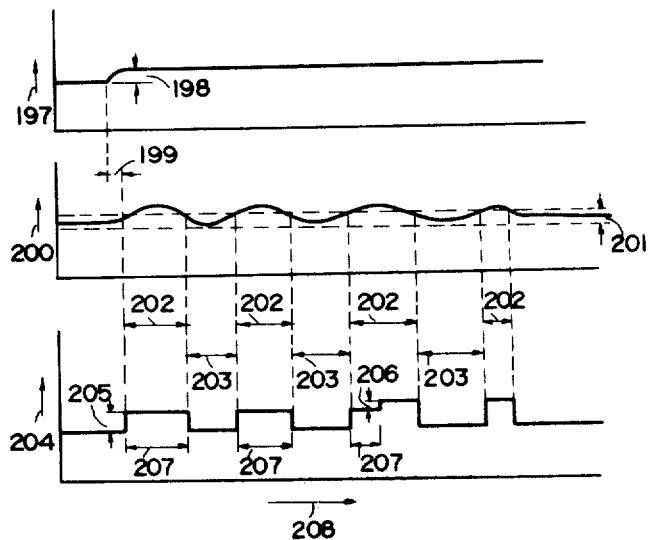
Figure 9:
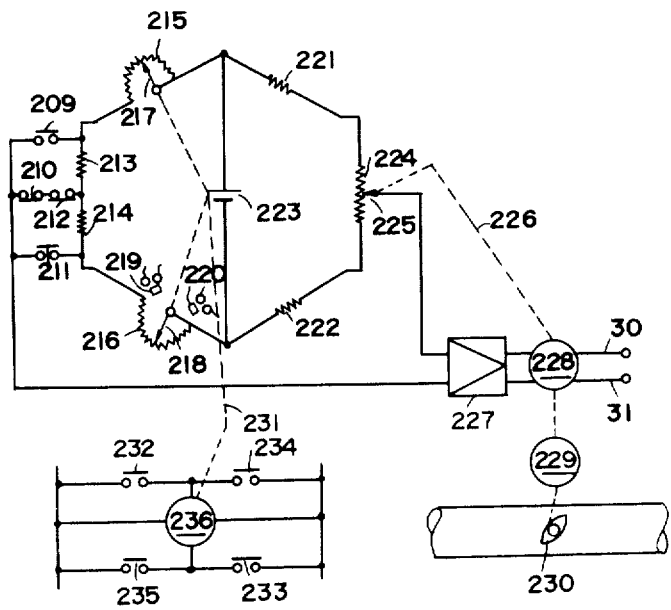
Figure 10:
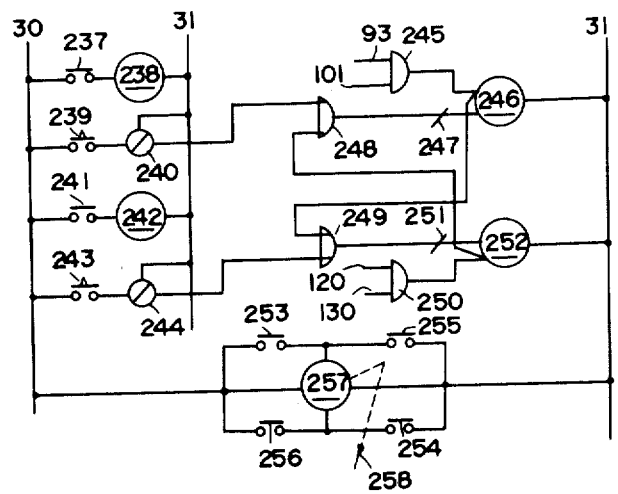
Figure 11:
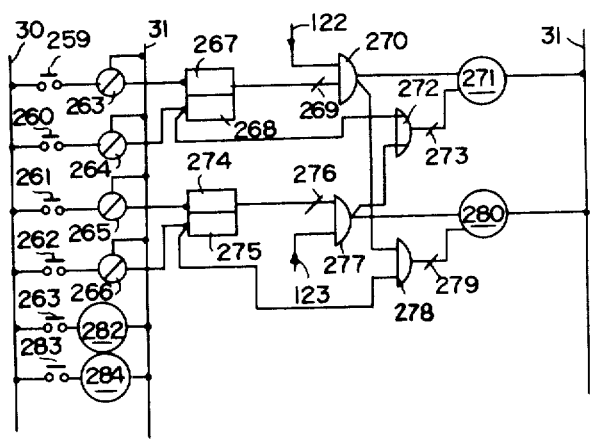
Figure 12:
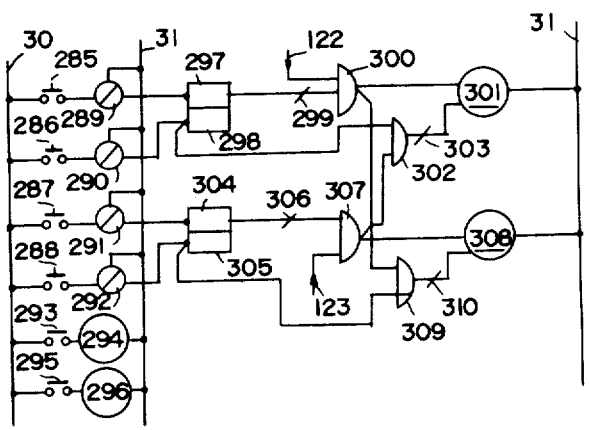

FIG. 1 shows a diagram indicating the relationship between the variation $\Delta H$ in a heat value in front of the tuyere and the variation $\Delta C_T$ in an amount of carbon burnt in front of the tuyere. FIG. 2 shows a diagram indicating the relationship between the variation $\Delta C_T$ in an amount of carbon burnt in front of the tuyere and the change ratio of the falling speed of the charge. FIG. 3 shows a diagram indicating a circuit of the falling speed computing and detecting device as an example of the present invention. FIG. 4a is a Table showing various symbols used in the drawings and their meanings. FIG. 4b is a diagram indicating a falling speed computing control circuit as an example of the present invention. FIG. 5 is a diagram indicating a falling speed deviation detecting circuit as an example of the present invention. FIG. 6 is a diagram indicating a pulse-control and step-control circuit as an example of the present invention. FIG. 7 is a diagram indicating a step-control circuit as an example of the present invention. FIG. 8 is a diagram indicating a control response circuit as an example of the present invention. FIG. 9 is a diagram indicating a controlled system control circuit as an example of the present invention. FIG. 10 is a diagram indicating a set value revising control circuit as an example of the present invention. FIG. 11 is a diagram indicating an ore/coke ratio control alarm circuit as an example of the present invention. FIG. 12 is a diagram indicating a charge basicity control alarm circuit. FIG. 13 is a schematic diagram showing the overall control apparatus with the interconnections between parts thereof.

The automatic control method according to the present invention is fundamentally based on the recognition that the falling speed of the charge has a close relationship with the temperature and heat value supplied in the hearth and bosh of the furnace. However, this relationship between both may be obtained only indirectly on the basis of the experimentally obtained data as shown in FIGS. 1 and 2. These data have been obtained in the runs, using a blast furnace of the furnace capacity of 650 m.³ and the diameter of the hearth 6.2 m. FIG. 1 shows relations between the variation $\Delta H$ in the heat value in front of the tuyere and the variation $\Delta C_T$ in the amount of carbon burnt in front of the tuyere under the conditions of the temperature of the top gas being 200° C. and the temperature of the blast being 800° C., 900° C. and 1,000° C., respectively. It is obviously seen from FIG. 1 that there exists a close relationship between the amount of carbon $C_T$ burnt in front of the tuyere and heat value H in front of the tuyere. FIG. 2 shows relations between the variation $\Delta C_T$ in the amount of carbon burnt in front of the tuyere and the change rate of the falling speed V in case of $C_T$ being 350 kg./t—iron and 380 kg./t—iron, respectively. Thus, the relationship between the falling speed of the charge and the heat value in front of the tuyere may be indirectly ascertained.

The control apparatus for carrying out the control of the operation of the blast furnace according to the method of the invention is shown schematically in FIG. 13. It comprises a computing circuit for receiving the position of the charge in the furnace and computing therefrom the falling speed of the charge. The output thereof is fed to a deviation detecting circuit which detects the deviation from a predetermined falling speed. The deviation is then fed to a logical computing circuit which has included therein switch means for operating each of the factors for controlling operation of the blast furnace and which has a pulse control derivative control circuit included therein, and an element for operating a control means for each factor to be controlled. The output from this computing circuit is then fed to the control circuits for controlling the individual factors. There is also provided a step control integral control circuit to which the output of the logical computing circuit is fed, the output of which is fed to the element for operating the control means for each factor to be controlled. Outputs from the pulse control derivative control circuit are also fed to an ore/coke ratio control alarm circuit and a charge basicity control alarm circuit. In order to make corrections in the predetermined value of the sinking speed of the charge, there is a set value revising control circuit which is supplied with output from the logical computing circuit and the controlled elements for operating the control means for each factor to be controlled. The individual circuits will be described hereinafter..

FIGS. 3 to 12 show the individual control circuit according to the present invention. In FIG. 3 indicating the circuit of the falling speed computing and detecting device, 3 is a chain line showing transfer mechanism for transmitting the shifting of known depth measuring appliance. 2 is a brush for detecting the depth position. 1 is a depth position detecting slide resistance. 4, 5, 7 and 8 are fixed resistances respectively. 6 is a power source device. 9 is a balancing slide resistance. 10 is a brush of 9. 11 is a chain line indicating the transfer mechanism from a servomotor 13 to the brush 10. 12 is an amplifier. 14 and 15 are closed contacts of a relay 43, which are to be excited by an open contact 39 of a timer 33 which determines the time required for balancing. 16 and 19 are open contacts of a potentiometer balancing relay 51, which are to be excited by an open contact 48 of a timer 45 which determines the rate time (derivative action time). 21 is a power source device. 22 is a potentiometer balancing slide resistance. 20 is a brush of 22. 17 is an amplifier. 18 is a servomotor. 23 is a chain line indicating a transfer mechanism from the servomotor 18 to the brush 20. 24 is a chain line indicating a transfer mechanism to an electric displacement detecting brush 52 of a controller shown in FIG. 5. 30 and 31 are operating power source bus bars common to all Figures. In FIG. 4 indicating the falling speed computing circuit, 25 is a pushbutton for actuating the falling speed detecting device and 34 is a pushbutton for stopping said device. 26, 35, 40 and 49 are transformers respectively. 39 is an open contact of the timer 33. 48 is an open contact of a timer 45 which determines the rate time. FIG. 4a shows the various symbols used in the circuit diagrams, and the meaning of them.

In FIG. 4b a memory element 27 is shown which memorizes an input ($a$) and gives an output ($c$). But, the output ($c$) is eliminated by an input ($b$). Hereinafter, this memory element is designated as an M element which memorizes the switching-in of a signal from a pushbutton such as a pushbutton 25, and is reset by a signal to the portion corresponding to part 28 thereof. 41 is an M element, which memorizes the closing of the open contact 39 of the timer 33, and 46 is a reset element which eliminates the memory of the M element 41 by receiving an output from A 47 when the open contact 48 of the timer 45 is closed in case of the open contact 39 of the timer 33 being closed. An element 36 is provided which is a "not" element. That is, if there is an input ($a$) an output ($c$) is eliminated, and if there is no input ($a$), the output ($c$) is given. Such an element is hereinafter designated as an N element The N element eliminates the output from the memory element M 41. The element designated by 37 is a delay element by which an output is produced a certain time after an input is supplied thereto. Such an element is hereinafter designated as a TD element, which in this instance sends out an output after a lag of a certain time when an output is supplied from N 36.

An element 38 is provided which indicates an "or" relation, that is, produces an output from only one of the inputs. An output ($c$) is produced when there is either an input ($a$) or an input ($b$). Such an element is hereinafter designated as an O element, which is this case produces an output only when fed an input from either an output from TD 37 or from amplifier 50. An element 29 is provided which indicates an "and" relation, that is, produces an output when supplied with all inputs. An output ($c$) is produced only when both an input ($a$) and an input ($b$) are provided. Such an element is hereinafter designated an A element, which in this case produces an output only when inputs are supplied both from M 27 and O 38. Amplifiers 32, 42, 44 and 50 are designated by a conventional symbol therefor.

In FIG. 5, which shows a mechanism for detecting deviations of the actual falling speed from the preset falling speed, 24 is a chain line connecting the servomotor 18 with a controller brush 52. 53 is a detecting slide resistance and 54, 55, 56 and 57 are fixed resistances respectively. 58 is a power source. 59 is a balancing slide resistance and at the same time a setting slide resistance. 60 is a brush thereof. 258 is a chain line showing transfer mechanism from a set value alternating control motor 257 shown in FIG. 10. 61 is a AP element. 62 is an operating coil for for traversing a mercury switch 64 either to the positive or negative direction according to the direction of deviation. 63 is a chain line showing a transfer mechanism thereof. 65 shows a connection line in case of the memory switch 64 being short-circuited with the power source 30 when the actual falling speed is over the preset value (the increased falling speed), and 66 a connection line in case of the mercury switch 64 being short-circuited with the power source 30 when the actual falling speed is below the preset value (the decreased falling speed). In FIG. 6, which shows a pulse-control circuit, 65 is a connection line in case of the increased falling speed, and 66 a connection line in case of the decreased falling speed. 79, 80, 81, 82, 83, 84, 85, 86, 87, 88, 89, 90, 91 and 92 are IT elements respectively. 67 is a pushbutton switch in case of Si content of pig iron being unusually high, that is, higher than its desired value. 68 is a reset pushbutton thereof. 69 is a pushbutton switch in case of S content of pig iron being unusually low, that is, lower than its desired value. 70 is a reset push button thereof. 71 is a pushbutton switch in case of basicity of slag being unusually high, and 72 a reset pushbutton thereof. 73 is a pushbutton switch in case of Si content of pig iron being unusually low and 74 is a reset pushbutton thereof. 75 is a pushbutton switch in case of S content of pig iron being unusually high, and 76 a reset pushbutton thereof. 77 is a pushbutton switch in case of basicity of slag being unusually low and 78 a reset pushbutton switch thereof. (In the foregoing only Si and S contents of pig iron and basicity of slag have been referred to for the sake of simplicity, though the present invention is not limited to refer to them only. Other factors such as composition and temperature of top gas may also be added.) 93 is a line connecting to A 245 in the set value alterating control circuit shown in FIG. 10. 94 is an A element which acts and sends out an output only when it receives superposingly an input of the increased falling speed and inputs indicating that Si and S contents of pig iron and basicity of slag are all logical to said input of the increased falling speed. 95 is an AP element. 96 is a relay for pulse-controlling the temperature of blast to elevate the same. 103 is an A element which sends out an output by receiving both an output of A 94 and an output signal 102 of the blast temperature upper limit switch 150 shown in FIG. 7. 104 is an AP element. 105 is a relay for pulse-controlling a humidity of blast to reduce the same. 107 is an A element which sends out an output by receiving both an output of A 94 and an output signal 106 of a blast humidity upper limit switch 151 shown in FIG. 7. 108 is an AP element. 109 is a relay for pulse-controlling fuel to be blown in (heavy oil and the like) to increase the same. 118 is an integration mechanism for integrating output signals from A 94. 119 is its output signal and gives an output to A 167, A 172, A 177 and AP 165 shown in FIG. 7. 117 is an N element for resetting the integration mechanism 118, which eliminates the output by an output signal of A 121 or an output signal 115 sent out by closing an open contact 149 of a step-controlling timer 166 shown in FIG. 7. The integration mechanism 118 is so constructed that the reset value thereof will be returned to zero at once by the elimination of an output N 117.

116 is an O element, which sends out an output by an output signal of A 121 or by the output signal 115 of the open contact 149 of the timer 166 shown in FIG. 7. 98 is an M element which memorizes that Si content of pig iron is unusually high and sends out an output. 99 is a reset element of the memory of 98. 110 is an M element which memorizes that S content of pig iron is unusually low and gives an output. 111 is a reset element of the memory of 110. 113 is an M element which memorizes that basicity of slag is unusually high and sends out an output. 114 is a reset element of the memory of 113. 112 is an O element which sends out an output either by an input from M 110 or M 113. 110 is an O element which gives an output either by an input from O 112 or M 98. 101 is a connection line for delivering an output to A 245 shown in FIG. 10. 97 is an N element which receives an input from O 100 and eliminates the output thereby. 122 is a line connecting to A 270 shown in FIG. 11 and to A 300 shown in FIG. 12. 120 is a line connecting to A 250 in the set value alternating control circuit shown in FIG. 10. 121 is an A element which acts and sends out an output only when it receives superposingly an input of the decreased falling speed and inputs indicating that Si and S contents of pig iron and basicity of slag are all logical to said input of the decreased falling speed. 124 is an AP element. 125 is a relay for pulse-controlling fuel to be blown in (heavy oil and the like) to reduce the same. 132 is an A element, which sends out an output by an output of A 121 and by an output signal 131 of the fuel lower limit switch 154 shown in FIG. 7. 133 is an AP element. 134 is a relay for pulse-controlling the temperature of blast to reduce the same. 136 is an A element which sends out an output by an output A 121 and an output signal 135 of the blast temperature lower limit switch 155 shown in FIG. 7. 137 is an AP element. 138 is a relay for pulse-controlling the humidity of blast to reduce the same. 147 is an integration mechanism for integrating an output signal of A 121. 148 is its output signal for delivering an output to A 181, A 187, A 192 and AP 182 shown in FIG. 7, respectively. 311 is an N element for resetting the integration mechanism 147, which is so constructed that an output is eliminated by the output signal of A 94 or a signal 145 sent out by closing an open contact 153 of a step-controlling timer 183 shown in FIG. 7. When the output of N 311 is eliminated, the reset value of the integration mechanism 147 is at once returned to zero. 146 is an O element which delivers an output to N 311. 127 is an M element, which memorizes that Si content of pig iron is unusually low and sends out an output. 128 is a reset element of the memory of 127. 139 is an M element which memorized that S content of pig iron is unusually high and sends out an output. 140 is a reset element of the memory of 139. 142 is an M element which memorizes that basicity of slag is unusually low and sends out an output. 143 is a reset element of the memory of 142. 141 is an O element which sends out an output either by an input from M 139 or M 142. 129 is an O element which sends out an output either by an input from O 141 or M 127. 130 is a connection line for delivering an output to A 250 shown in FIG. 10. 126 is an N element which eliminates an output when there is an input from O 129 and sends out an output when the input is eliminated. 123 is a line connecting to A 277 shown in FIG. 11 and to A 307 shown in FIG. 12. In FIG. 7, which shows a step-control circuit comprising two kinds of circuits, that is, the circuit in the case of the increased falling speed and that in the case of the decreased falling speed. In the former circuit, 119 is an input signal line from the integration mechanism 118. 167 is an A element which acts by an output of N 168 and the input from 119. 165 is an AP element. 166 is a timer which determines the step-time (ref. 206 in FIG. 8). 169 is an AP element. 170 is a relay for increasingly controlling an average manipulated variable of the temperature of the blast. 149 is an open contact of the timer 166. 157, 158, 159, 160, 161, 162, 163 and 164 are IT elements respectively. 115 is a line connecting to O 116 for resetting the integration mechanism 118. 150 is a limit switch which acts at the uppermost limit of the temperature of the blast. 102 is an output connection line delivering an input to A 103. 168 is an N element which eliminates the output by an output of the limit switch 150. 151 is a limit switch which acts at the lowermost limit of the humidity of blast. 106 is a signal connection line which delivers an output to A 107. 171 is an N element which eliminates the output by an output of the limit switch 151. 172 is an A element which acts by the input from 119 and an output of N 171. 173 is an A element which acts by an output of A 172 and an output of the limit switch 150 which acts at the uppermost limit of the temperature blast. 174 is an AP element. 175 is a relay for decreasingly controlling an average manipulated variable of the humidity of the blast. 152 is a limit switch which acts when the fuel to be blown in such as heavy oil reaches the uppermost limit. 176 is an N element which eliminates the output by the output of the limit switch 152. 177 is an A element which sends out an output by an input from 118 and an output of N 176. 178 is an A element which acts by an output of A 177 and an output of the limit switch 151 and sends out an output. 179 is an AP element. 180 is a relay for increasingly controlling an average manipulated variable of the fuel blown in. On the contrary, in the case of the decreased falling speed, 148 is an input signal line from the integration mechanism 147. 181 is an A element which acts by the output of N 184 and the input from 148. 182 is an AP element. 183 is a timer which determines the step-time (corresponding to 206 in FIG. 8). 185 is an AP element. 186 is a relay for decreasingly controlling an average manipulated variable of the fuel blown in. 153 is an open contact of the timer 183. 145 is a line connecting to O 146 for resetting the integration mechanism 147. 154 is a limit switch which acts at the uppermost limit of the fuel blown in. 131 is an output connection line which delivers an output to A 132. 184 is an N element which eliminates the output by the signal of the limit switch 154. 155 is a limit switch which acts at the lowermost limit of the temperature of blast. 135 is a signal connection line which delivers an output to A 136. 188 is an N element which eliminates the output by the output of the limit switch 155. 187 is an A element which acts by the input from 148 and the output of N 188. 189 is an A element which acts by the output of A 187 and the output of the limit switch 154 which acts at the uppermost limit of the fuel blown in. 190 is an AP element. 191 is a relay for decreasingly controlling an average manipulated variable of the temperature of blast. 156 is a limit switch which acts at the uppermost limit of the humidity of blast. 193 is an N element which eliminates the output by the output of the limit switch 156. 192 is an A element which acts by the input from 148 and the output of 193. 194 is an A element which acts by the output of A 192 and the output of the limit switch 155 and sends out the output. 195 is an AP element. 196 is a relay for increasingly controlling an average manipulated variable of the humidity of blast. In FIG. 8 which shows the changes in manipulated variables corresponding to the changes in the falling speed, 197 is an arrow indicating a change in the conditions. 198 is a curve showing that a change occurred stepwise in the conditions. 199 shows a dead time which would lapse until the change is detected and controlled. 200 is an arrow indicating a change in the falling speed. 201 is a set range. 202 is an arrow of time indicating that the actual falling speed is out of the set range. 203 is an arrow of time indicating that said falling speed is within the set range. 204 is an arrow indicating a manipulated variable. 205 is a range indicating a manipulated variable of the pulse-control. 206 is a range indicating manipulated variable of the step-control. 207 is an arrow of time range indicating the reset time. 208 is an arrow indicating the time. In FIG. 9, which shows the circuit for controlling the controlled systems, only one of three controlled systems (temperature of blast, humidity of blast and fuel blown in) has been referred to for the sake of simplicity. However, it is to be understood that the respective circuits are prepared for all other controlled systems. 209 and 210 are those corresponding to the open contact and closed contact of the relay 96, respectively, in the case of controlling the temperature of blast, to the open contact and closed contact of the relay 105, respectively, in the case of controlling the humidity of blast, and to the open contact and closed contact of the relay 109, respectively, in the case of controlling the fuel blown in. 211 and 212 are those corresponding to the open contact and closed contact of the relay 125, respectively, in the case of controlling the fuel blown in, to the open contact and closed contact of the relay 134, respectively, in the case of controlling the temperature of blast and to the open contact and closed contact of the relay 138, respectively, in the case of controlling the humidity of blast. 213 is a resistance corresponding to the increased falling speed, said resistance being passed when the relay (96 or 105 or 109) is excited by the increased falling speed. 214 is a resistance corresponding to the decreased falling speed, said resistance being connected in series with the resistance 213 when the relay (125 or 134 or 138) is excited by the decreased falling speed. 215 and 216 are the regulating resistance for the step-control, whereby the average value is controlled. 217 and 218 are the brushes of 215 and 216, respectively. 223 is a power source. 221 and 222 are fixed resistances, respectively. 224 is a balancing slide resistance. 225 is a brush of 224. 219 corresponds either to the limit switch 150 or 151 or 152 shown in FIG. 7. 220 corresponds either to the limit switch 154 or 155 or 156 shown in FIG. 7. 227 is an amplifier. 228 is a servo and driving motor. 226 is a chain line indicating a connecting mechanism which connects the brush 225 and the servo and driving motor 228. 229 is a reduction device of a final control element. 230 shows a valve at the final control element as an example. 232 and 233 correspond to the open contacts of the step-controlling relay (170 in case of controlling the temperature of blast, 175 in case of controlling the humidity of blast and 180 in case of controlling the fuel blown in) in the case of the increased falling speed shown in FIG. 7. 234 and 235 correspond to the open contacts of the step-controlling relay (186 in case of controlling the fuel blown in, 191 in case of controlling the temperature of blast and 196 in case of controlling the humidity of blast) in the case of the decreased falling speed shown in FIG. 7. 236 is a control motor which rotates in the positive direction by the open contacts 232 and 233 and in the reverse direction by the open contacts 234 and 235. 231 is a chain line connecting the control motor 236 with the brushes 217 and 218.

In FIG. 10 which shows a circuit of controlling the setting brush 258, 101 is a connection line from O 100 shown in FIG. 6, and 93 is a connection line from it 79 shown in FIG. 6. 245 is an A element. 248 is an O element which sends out an output by the closing of the open contact 239 of the timer 238 or the output of A 250. 247 is an N element which eliminates the output by the output of O 248. 246 is an integration mechanism corresponding to the increased falling speed, in which the mechanism integration is carried out by the signals from N 247 and A 245 and the integral is reduced to zero by the elimination of the output of N 247. 237 is closed when the reset time is reached at the open contact of the integration mechanism 246. 239 is an open contact of the timer 238. 241 is closed when the reset time is reached at the open contact of the integration mechanism 252 corresponding to the decreased falling speed. 238 is a timer. Elements 240 and 244 are transformers. Such elements are hereinafter designated as IT elements. 249 is an O element which sends out an output by the output of the open contact 243 of the timer 242 or by A 245. 251 is an N element which eliminates the output by the output of O 249. 130 is a connection line from O 129 shown in FIG. 6. 250 is an A element. The action of the integration mechanism 252 is quite the same as the integration mechanism 246. 253 and 254 are the open contacts of the integration mechanism 246. 255 and 256 are the open contacts of the integration mechanism 252. 257 is a control motor for controlling the setting brush 60 shown in FIG. 5. 258 is a chain line showing the connection of the control motor 257 and the setting brush 60.

In FIG. 11, which shows an alarm circuit the integration mechais 280. 28 2 controlling the ratio of ore to coke, 259 is a is in case of the ratio of ore to coke being unusually low. 260 is a reset pushbutton switch to O 272 for resetting its reset and the integration mechanism 271. 261 is a pushbutton switch in case of the ratio of ore to coke being unusually high. 262 is a reset pushbutton to O 278 for resetting its reset and the integration mechanism 280. 263, 264, 265 and 266 are IT elements, respectively. 281 is an open contact of the integration mechanism 271. 283 is an open contact of the integration mechanism 280. 282 is a relay indicating the necessity of elevating the ratio of ore to coke. 267 is an M element which memorizes that the ratio of ore to coke is unusually low. 268 is a reset element of 267. 269 is an N element which eliminates the output by the output memory of M 267. 122 is an output signal from A 94 shown in FIG. 6. 270 is an A element which sends out an output by the signal 122 and an input from N 269. 271 is an integration mechanism (a mechanism of integrating and informing that the ratio of ore to coke is to be lowered, corresponding to the increased falling speed). 272 is an O element which sends out an output either by the output of its reset pushbutton switch 260 or the output of A 277. 273 is an N element which eliminates the output by the output of O 272. 274 is an M element which memorizes that the ratio of ore to coke is unusually high. 275 is a reset element of 274. 276 is an N element which eliminates the output by the output memory of M 274. 123 is an output signal from A 121 shown in FIG. 6. 277 is an A element which sends out the output signal 123 and the input from N 276. 280 is an integration mechanism (a mechanism of integrating and informing that the ratio of ore to coke is to be lowered, corresponding to the decreased falling speed). 278 is an O element which sends out an output by the output of the reset pushbutton 262 or the output of A 270. 279 is an N element which eliminates the output by the output of O 278. Both the integration mechanisms 271 and 280 are so constructed that the integrals will be reduced to zero by the elimination of the outputs of N elements 273 and 279.

In FIG. 12, which is an alarm circuit for controlling the ratio of CaO to $SiO_2$ of the charge, 285 is a pushbutton switch in the case of the ratio of CaO to $SiO_2$ of the charge (calculated value) being unusually high. 286 is a reset pushbutton switch to O element 302 for resetting its reset and the integration mechanism 301. 287 is a pushbutton switch in the case of the ratio of CaO to $SiO_2$ of the charge (calculated value) being unusually low. 288 is a reset pushbutton to O element 309 for resetting its reset and the integration mechanism 308. 289, 290, 291 and 292 are IT elements, respectively. 293 is an open contact of the integration mechanism 301. 295 is an open contact of the integration mechanism 308. 294 is a relay indicating the necessity of elevating the ratio of CaO to $SiO_2$. 297 is an element M which memorizes that the ratio of CaO to $SiO_2$ is unusually high. 298 is a reset element of 297. 299 is an N element which eliminates the output by the output memory of M 297. 122 is an output signal from A 94 shown in FIG. 6. 300 is an A element which sends out the output when both the signal 122 and the output of N 299 are given. 301 is an integration mechanism which performs the integration corresponding to the increased falling speed and informs that the ratio of CaO to $SiO_2$ of the charge is to be elevated. 302 is a resetting O element, which sends out the output either by the output of the pushbutton 286 or the output of A 307. 303 is an N element which eliminates the output by the input from O 302. 304 is an M element which memorizes that the ratio of CaO to $SiO_2$ is unusually low. 305 is a reset element of 304. 306 is an N element which eliminates the output by the output memory of M 304. 123 is an output signal from A 121 shown in FIG. 6. 307 is an A element which sends out the output when both the signal 123 and the output of N 306 are given. 308 is an integration mechanism which performs an integration, corresponding to the decreased falling speed and informs that the ratio of CaO to $SiO_2$ of the charge is to be lowered. 309 is a resetting O element, which sends out the output by the output of the pushbutton switch 288 or the output of A 300. 310 is an N element which eliminates the output by the input from 309.

The operation of the apparatus according to the present invention as above mentioned will be explained in reference to the drawings. The position signal 3 shown in FIG. 3 is dispatched from any known depth measuring appliance, for instance sounding device, which measure the depth of the charge. The falling speed of the charge is detected by means of the falling speed computing and detecting device by computing the time differentials of the variations in said position. In case of actuating said falling speed computing and detecting device the actuating pushbutton switch 25 is pushed to cause M element 27 to memorize the switch in of 25 and send out the output. A 29 sends out the output as it receives the output of N 36 through TD 37 and O 38 and thereby actuates the balancing timer 33 through AP 32. After the lapse of a certain time (usually about 5 seconds) the open contact 39 is closed, thereby M 41 memorizes the output and excites the switching relay 43 through AP 42 and the rate time timer 45 through AP 44. On the other hand, as N 36 eliminates the output by receiving the input, A 29 eliminates the output and the balancing timer 33 is nonexcited. If the relay 43 is excited, the closed contacts 14 and 15 are opened. Consequently, the brush 2 and the brush 10 are balanced and thereafter only the brush 10 stops completely at its position. When the timer 45 reaches the rate time (usually 30 seconds, though not limited thereto), the open contact 48 is closed, thereby the switching relay 51 is excited through AP 50 and at the same time the output is given also to O 38, thereby the timer 33 is again excited through A 29 and AP 32. When 51 is excited, the open contacts 16 and 19 are closed. Consequently, only so much potential differences as corresponding to the advance of the brush 2 during the rate time are given to the amplifier 17 to cause the brush 20 to shift so far as said potential differences become zero. Thus, by repeating the above-mentioned actions several times, the detection of the falling speed of the charge may be performed. On the other hand, if the timer 33 closes the open contact 39 after the lapse of a certain time, this time the open contact 48 is closed, thereby A 47 sends out the output to M 46 to eliminate the memory of M 41. Then, the relay 43 and the timer 45 are nonexcited, and further by the opening of the open contact 48 of the timer 45 the relay 51 and the timer 33 are also nonexcited, the open contacts 16 and 19 of the relay 51 are opened and the brush 20 stops at its position and further by the nonexciting of the timer 33 the open contact 39 is opened and A 47 eliminates the output.

Meanwhile, N 36 sends out again the output by the elimination of the output of M 41, and TD 37 excites again the timer 33 by sending out the output to A 29 after the lapse of about 3 seconds (the time of 3 seconds is that required for the completion of switching over). In this manner the falling speed is computed and detected by repeating the operations until the stopping pushbutton switch 34 is pushed. The measurement may be easily obtained by putting the graduations of the falling speed on the slide resistance 22, as occasion demands. The change in the falling speed thus detected is transferred to the brush 52 of the controlling mechanism shown in FIG. 5 in the form of the rotation of the servo motor 18 through the transfer mechanism 24. If at this time any deviation exists between the set brush 60 and said brush 52 the amplifier 61 is excited, thereby the control coil 62 is excited in the direction of said deviation. For example, in the case of the increased falling speed, the control coil 62 is inclined in the direction wherein 65 and 30 are short-circuited, while in the case of the decreased falling speed it inclines in the direction, wherein 66 and 30 are short-circuited. When the increased falling speed is detected, the connection line 65 shown in FIG. 6 sends out the output, and A 94 receives an input therefrom through IT 79. At this time, however, if any of the pushbutton switches 67, 69 and 71 is being pushed, that is, the pushbutton switch 67 in case Si content of pig iron is unusually high, the pushbutton switch 69 in case S content is unusually low or the pushbutton switch 71 in case the basicity of slag is unusually high, there is no output from N 97 because the output is given thereto through O 112 and O100, and consequently A 94 does not also send out the output. Therefore, the regulation of the blast conditions is not performed in these cases. However, if Si and S contents of pig iron and the basicity of slag are all not unusual, that is, all of them show the logical values for the increased falling speed, and consequently the reset pushbutton switches 68, 70 and 72 are being pushed, thereby M 98, M 110 and M 113 are being reset by M 99, M 111 and M 114, A 94 gives out instantly the output, whereby the relay 96 is excited, closing the open contact 209 and opening the closed contact 210 shown in FIG. 9. Then, the deviation voltage is amplified by the amplifier 227 to cause the servo-driving motor 228 to rotate in the positive direction, thereby the brush 225 on the slide resistance 224 is shifted through the transfer mechanism 226 to effect the balancing. On the other hand, the servo-driving motor 228 is pulse-controlled through the speed reduction device 229 in the direction of closing the cold blast valve 230, for instance, in the case of the blast temperature. When the actual falling speed is returned to the set value on account of the performance of the control, the amplifier 61 eliminates instantly the output, the control coil 62 is thereby nonexcited, and the short circuit of 65 and 30 is disconnected as result of the inclination of the mercury switch being reduced to the normal position. Then, A 94 eliminates the output and the relay 96 is nonexcited, opening the open contact 209 and closing the closed contact 210 shown in FIG. 9. Consequently, the deviation voltage is again amplified by the amplifier 227 to cause the servo-driving motor 228 to rotate the same in the reverse direction to reduce the brush 225 to the position before the control, accompanied by the return of the cold blast valve 230 to the position before the control. While carrying out thus the pulse-control, the integration mechanism integrates the output signals coming from A 94 and sends out the output signal 119 at the time when a certain reset time has reached (the reset time is usually set to about 1 hour, but not limited thereto). Then, A 167 in the step-control circuit shown in FIG. 7 sends out the output because the output is given from the output signal 119 to A 167 and on the other hand the output is also sent out from N 168 thereto, while the limit switch 150 being not closed. By the output of A 167 the control relay for increasing the temperature of blast 170 is excited. At the same time, as the signal 119 gives the output also to the timer 166, the latter begins to operate. If the relay 170 is excited, the open contacts 232 and 233 for rotating the step-control motor 236 shown in FIG. 9 in the positive direction are closed, thereby the motor 236 begins to rotate in the positive direction to shift gradually the slide brushes 217 and 218 on the slide resistances 215 and 216. On the other hand, as the timer 166 will close the open contact 149 after the lapse of a certain time (usually 5 seconds, but not limited thereto), the resetting O 116 of the integration mechanism 118 sends out the output by the output signal 115 of the open contact 149 and the output of N 117 is eliminated. Consequently, the integration mechanism 118 is reduced to zero and the output signal 119 is eliminated. Then, both A 167 and the timer 166 are deenergized as the inputs are eliminated. The relay 170 is also nonexcited, closing thereby the open contacts 232 and 233 thereof. Accordingly, the control motor 236 stops and the brushes 217 and 218 cease to shift. Then, the amplifier 227 sends out instantly the output, as so much deviation voltage as corresponding to the shifts of the brushes 217 and 218 is supplied thereto, to cause the servo-driving motor 228 to rotate in the positive direction, thereby to shift the balancing brush 225 to the balanced position. Therefore, also the cold blast valve 230 of the controlled system is controlled in the direction of being closed through the speed reduction device 229. The step-control proceeds in this way, and when the brush 218 reaches the limit switch 219 (which corresponds to the limit switch 150, 151 or 152 shown in FIG. 7) or the limit switch 220 (which corresponds to the limit switch 154, 155 or 156 shown in FIG. 7) these limit switches are closed.

For instance, in the case of the limit switch 150 as an example, if the brush 218 reaches the limit switch 219 shown in FIG. 9 in the step-control the limit switch 150 shown in FIG. 7 is closed. Then, as the output is given to N 168 through IT 158, N 168 is deenergized, thereby the relay 170 becomes nonexcited. At the same time, as the output is also given to A 172 of the next relay 175, A 173 sends out the output by the output of A 172 to excite the relay 175, that is, the control relay for decreasing the humidity of blast. Thus, the controlled system is shifted to the next one.

The pulse-control proceeds also in the same manner as above mentioned, that is, the controlled system is shifted to the next one by the output of the limit switch. For instance, in the case of the limit switch 150 as an example, that output 102 is given to A 103, thereby to excite the relay 105, that is, the pulse-control relay for reducing the humidity of the blast. In such a sequence the relay 109, that is, the relay for increasingly controlling the fuel blown in, is also excited by the output signal 106 of the limit switch 151. On the other hand, the integration mechanism 118 is reset by the reverse control signal, that is, by the output of A 121 so as to be returned to zero, and also the integration mechanism 147 is reset likewise by the reverse control signal, that is, by the output of A 94 so as to be returned to zero.

Also in the case of the decreased falling speed the control is carried out in the same manner as in the case of the increased falling speed. If the signal line 66 and the power source 30 is short-circuited by the inclination of the mercury switch 64, an output will be given from IT 86. However, in this case, if any of the pushbutton switch 73 (for the case of Si content of pig iron being unusually low), the pushbutton switch 75 (for the case of S content of pig iron being unusually high) and the pushbutton switch 77 (for the case of the basicity of slag being unusually low) is being pushed, thereby sending an output signal to N 126, A 121 does not send out the output. But, if no output is being given to N 126, A 121 will send out instantly the output, whereby the pulse-control will be carried out by exciting the relays 125, 134 and 138 in sequence in the same manner as in the case of the increased falling speed, while on the other hand the integration mechanism will be actuated by the output signal of A 121, and when a certain reset time is reached, the relays 186, 191 and 196 shown in FIG. 7 will be excited in sequence by the integration signal 148, whereby the step-control will be performed.

The shift of the controlled system to the next one is also performed in the same manner as in the case of the increased falling speed by actuating the limit switches 154, 155 and 156 in sequence. In the above explanation of the present invention the control of the controlled systems is carried out in sequence of the temperature of blast at first, the humidity of blast secondly and the fuel blown in at last in the case of the increased falling speed and reversely in the case of the decreased falling speed. Though this sequence has been adopted as being the most effective according to the runs made by the inventors, the present invention is not limited to this sequence, and the number of the controlled systems is also not limited to the above-mentioned three factors. Further, in the above explanation the operation of the pushbuttons 7, carried out manually. However, it is more feasible to automatize this operation.

Further, the control corresponding to the decreased falling speed will be explained in reference to FIG. 9. The contacts which correspond to the pulse-control relays 96, 105 and 109 shown in FIG. 6 are the open contact 209 and the closed contact 210. If the relay is excited, the open contact 209 is closed and the closed contact 210 is opened. As the deviation voltage is then supplied to the amplifier 227 to rotate the servo-driving motor 228 so as to be balanced, the brush 225 begins to shift and stops when it reaches the balanced point. Thus, the controlled system is controlled in the reverse direction as the motor 228 is connected with the speed reduction device 229. On the other hand, in the case of the step-control the contacts, which correspond to the step-control relays 186, 191 and 196 shown in FIG. 7 are the open contacts 234 and 235. If the relay is excited, both open contacts are closed and the control motor 236 is rotated in the reverse direction to shift the brushes 217 and 218 thereby. As the integration mechanism 147 is reset by the output 145 by the closing of the open contact 153 of the timer 183, the output 148 of the integration mechanism is eliminated and the relay becomes nonexcited. Consequently, the open contacts 234 and 235 are opened and the reverse rotation of the control motor 236 is stopped. Then the amplifier sends out instantly the output, because so much deviation voltage as corresponding to the shifts of the brushes 217 and 218 is supplied thereto. By the output of the amplifier 227 the servo-driving motor 228 begins to rotate in the reverse direction so as to shift the balancing brush 225 to the balance position. Thus, the valve 230 of the controlled system (valve for the fuel blown n in this case) is controlled in the direction of opening the same through the speed reduction device 229.

The step-control proceeds in such a manner as above mentioned and the shift of the controlled system to the next one is carried out just the same as in the case of the increased falling speed.

As seen from the above explanation the control method according to the present invention is to control the blast conditions by detecting the deviation of the actual falling speed of the charge from the preset falling speed and thereon superposing the signals of the compositions of pig iron, and/or composition of slag (further composition of top gas, temperature thereof and differential pressure of upper and lower parts of blast furnace may also be added). Therefore, the confidence of the control according to this method is on the assumption that the preset value of the falling speed as a reference input is adequate. If this preset value is not adequate, the control itself will be meaningless. Therefore, the set value itself is to be subjected to the revision so that is may always be the optimum one by means of the circuit as shown in FIG. 10. The revision of the preset value will be explained in reference to FIG. 10. In the case of the increased falling speed, if the signal 93 and the logical signal 101 indicating the conditions of Si and S contents of pig iron and basicity of slag are given to the integration mechanism 246 through A 245, or in the case of the decreased falling speed, if the signal 126 and further the logical signal 130 indicating the conditions of Si and S contents of pig iron and basicity of slag are given to the integration mechanism 252 through A 250, these integration mechanisms will begin to integrate, and when a certain reset time is reached (this time is usually about 3 hours, but is not limited thereto any may be regulated) the open contacts 253 and 254 (in the case of the increased falling speed) or the open contacts 255 and 256 (in the case of the decreased falling speed) are closed and further the open contact 237 (in the case of the increased falling speed) or the open contact 241 (in the case of the decreased falling speed) is also closed. Then, the operating motor 257 begins to operate by the above open contacts, rotating in the positive or reverse direction, whereby the set brush 60 shown in FIG. 5 is gradually shifted through the transfer mechanism 258. On the other hand, in the case of the increased falling speed, the timer 238 is actuated by the closing of the open contact 237 and after the lapse of a certain time (usually about 5 seconds) the open contact 239 is closed and gives an input to N 247 through O 248, whereby the output of N 247 is eliminated and consequently the integration mechanism 246 is reset. Or in the case of the decreased falling speed, the timer 242 is actuated by the closing of the open contact 241 and after the lapse of a certain time (usually about 5 seconds) the open contact 243 is closed and gives an input to N 251 through O 249, thereby the output of N 251 is eliminated and the integration mechanism 252 is reset. Then, in the case of the increased falling speed, the open contacts 253 and 254 are opened, whereby the rotation of the operating motor 257 stops and accordingly the shift of the set brush stops. Further, the timer 238 becomes nonexcited, the open contact 239 is opened, the reset of N 247 is also eliminated and thereby the integration mechanism 246 begins again to operate. Or in the other case of the decreased falling speed, the open contacts 255 and 256 are opened, resulting in stoppage of the rotation of the operating motor 257 and the shift of the set brush. Further, the timer 242 becomes nonexcited, the open contact 243 is opened, the reset of N 251 is eliminated and thereby the integration mechanism 252 begins again to operate. Further, the output of A 245 is given also to the resetting O 249 or the output of A 250 is given also to the resetting O 248 so that the reset may be applied to the respective integration mechanism.

The revision of the preset value is practically carried out in the following case: Here the case of the increased falling speed will be taken as an example. If the control signal 65 of the increased falling speed is always issued from the detecting device shown in FIG. 5, the furnace conditions should, of course, be of such a logical signal that Si content of pig iron is low, S content of pig iron high and the basicity of slag low. However, if the lock signal 101 is given notwithstanding, that will apparently indicate that the preset value is not adequate, but is biased to the side of the decreased falling speed. Therefore, in such a case, it is necessary to gradually bring the preset value back to the side of the increased falling speed to obtain the optimum preset value so that the desired composition of the final product, pig iron, or the desired composition of slag may be maintained. In the present invention the manipulated variable for revising the preset value is determined by using the timer only. However, it is also possible to determine the manipulated variable by computing the same in a linear type, corresponding to the quantities of deviations from the preset value, if a continuous signal detecting mechanism such as a slide resistance is used instead of detecting mercury switch 64 shown in FIG. 5, as occasion demands. It is also possible to control the pulse-controlled variable and step-controlled variable by computing them in a linear type. However, for the sake of simplicity an on-off signal has been adopted here by using the mercury switch. The control process of revising the preset value takes the time process as shown in FIG. 8. For instance, supposing that any disturbance occurs in a step-form 198, the falling speed will change with a lag of certain time 199 after the occurrence of the disturbance and will come out of the preset range, as shown by 202. Then, the blast conditions are to be pulse-controlled instantly, as shown by 205, provided that there is no lock signal from the side of the furnace conditions. As the control is a pulse-control, the manipulated variable will, of course, return to the previous state, when the falling speed comes within the set range 201. The control will be repeated in this way. However, it is usually impossible to secure the perfect comeback of the falling speed into the set range 201 only by means of the pulse-control in the case such a change as of the step-form 198 has occurred. Therefore, in this case the changes out of the set range are to be time-integrated, and when the integral reaches the preset integral value, the blast conditions are step-controlled so much as 206, whereby the falling speed may come back within the preset range 201. This preset range itself is controlled by the above-mentioned control circuit shown in FIG. 10. Further, also the pulse-controlled variable 205 and the step-controlled variable 206 are controllable to various quantities and may be adjusted according to the changes in the falling speed as occasion demands.

FIG. 11 is a circuit of controlling the ratio of ore to coke. When the calculated value of ore/coke is unusually high, N 269 will send out the output because the pushbutton switch 259 is not being pushed. In this case, if the output 122 of A 94 shown in FIG. 6 is added to the output of N 269 the integration of the increased falling speed is carried out by the integration mechanism 271, where the integration will usually take 6 to 8 hours. When this time is reached, the open contact 281 is closed and thereby the relay 282 will be excited, informing that there is a necessity of lowering the ratio of ore/coke. Though the alarm circuit has been adopted here for the sake of simplicity, it is also possible to automatically control the ratio of ore/coke by interlocking the alarm signal of the relay 282 to the side of the weighing machine. Thus, in the case of the increased falling speed of the charge the alarm signal of the relay 282 of lowering the ratio of ore/coke is issued by the integration mechanism 271 and, in the case of the decreased falling speed of the charge the alarm signal of the relay 284 of elevating the ratio of ore/coke is issued by the integration of the decreased falling speed by the integration mechanism 280.

FIG. 12 which shows a circuit for controlling the ratio of $CaO/SiO_2$ of the charge, is of the same principle as FIG. 11. For instance, in the case of the increased falling speed of the charge N 299 will send out the output, because the pushbutton switch 285 is not being pushed when the ratio of $CaO/SiO_2$ is unusually low. Then, the integration mechanism 301 will be actuated by the output of A 300 due to said output of N 299 and the output of 122 of A 94 shown in FIG. 6. After the lapse of 6 to 8 hours required for the integration the open contact 293 is closed and the relay 294 is thereby excited, alarming that the ratio of $CaO/SiO_2$ is to be elevated. On the contrary, in the case of the necessity of lowering the ratio of $CaO/SiO_2$ the alarm is issued from the relay 296 by means of the integration mechanism 308. When there occurs any fundamental disturbance which is not capable to be eliminated by the control of the blast conditions only, the charging conditions are thus subjected to the control by issuing the alarm signal, for instance, with regard to the ratio of ore/coke or the ratio of $CaO/SiO_2$ of the charge, so that the furnace may be operated with the lowest coke ratio or the optimum basicity of slag. Though the alarm signal is adopted for the sake of simplicity also with regard to the ratio of $CaO/SiO_2$, it is possible to automatically control said ratio by interlocking the signal to the side of the weighing machine.

Heretofore, the automatization of the operation of a blast furnace was regarded as being very difficult. However, by the method and apparatus according to the present invention not only the automatization of the furnace operation could be realized but also the following remarkable advantages could be attained: By making the detection of the falling speed of the charge feasible, any change in the furnace operation may be detected quickly in the early stage, the stability in the operating conditions may be obtained by performing the trail control of the blast conditions by superposing the signal of the falling speed of the charge and the logical signals representing the furnace conditions or the analysis values of the product, whereby the desired composition of the product, pig iron, may be maintained and further the furnace may be always carried out with the lowest coke ratio by controlling also the ratio of ore/coke or the ratio of $CaO/SiO_2$ of the charge by means of the superposition and integration of the signals of said charge conditions and the superposed signals of the falling speed of the charge and of the furnace conditions.

We claim:

1. A control means for carrying out the control of the operation of a blast furnace, comprising:
    computing means for computing the sinking speed of a charge in the blast furnace from a signal representative of the depth of the charge and produced by a conventional depth measuring appliance;
    detecting means coupled to said computing means for detecting a deviation of the computed sinking speed of the charge from a predetermined sinking speed and producing a signal representative of the direction of said deviation;
    signal superposing means coupled to said detecting means for superposing logical signals representative of factors affecting the furnace operating conditions on the signal representative of the direction of the said deviation of the sinking speed and producing a superposed signal;

control means coupled to said signal superposing means for pulse-controlling and step-controlling blast conditions and charge conditions according to the superposed signal; and means coupled between said signal superposing means and said detecting means for revising the predetermined sinking speed according to the relation between the direction of the detected deviation of the measured sinking speed and logical signals representative of factors affecting the furnace operating conditions.

2. A control apparatus for carrying out the control of the operation of a blast furnace, comprising:

a computing circuit for receiving a signal representative of the position of the depth of a charge in the blast furnace and computing the sinking speed of the charge therefrom and produces a signal representative of the sinking speed;

a deviation-detecting circuit coupled to said computing circuit for detecting the deviation of the computed sinking speed of the charge from a predetermined sinking speed and producing a signal representative of the direction of said deviation;

a logical computing circuit coupled to said deviation detecting circuit for superposing logical signals representative of factors affecting furnace operating conditions on the signal indicating the direction of said deviation of the sinking speed and producing a superposed signal;

a pulse-control circuit and a step-control circuit coupled to said logical computing circuit and adapted to be coupled to the blast furnace system and producing output signals for controlling blast conditions and charge conditions according to the superposed signal; and a set value revising control circuit coupled between said logical computing circuit and the deviation detecting circuit for revising the predetermined sinking speed used as a reference in said deviation detecting circuit according to the relation between the direction of the detected deviation of the measured sinking speed and logical signals representative of factors affecting the furnace operating conditions.